UNITED STATES PATENT OFFICE.

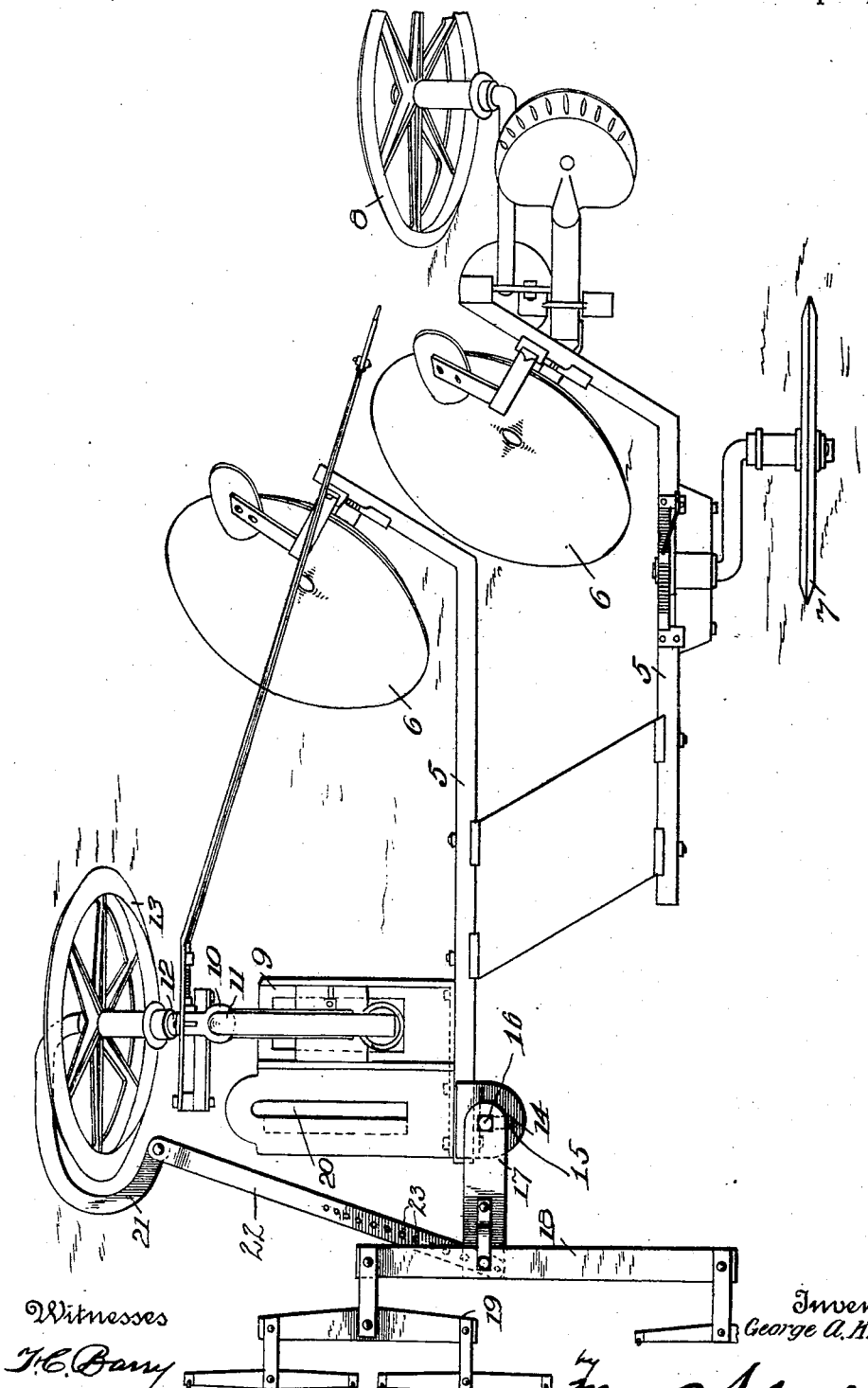

GEORGE A. KNOX, OF DEXTER, NEW YORK.

PLOW.

969,377.

Specification of Letters Patent.   Patented Sept. 6, 1910.

Application filed February 8, 1910. Serial No. 542,701.

*To all whom it may concern:*

Be it known that I, GEORGE A. KNOX, a citizen of the United States, residing at Dexter, in the county of Jefferson and State of New York, have invented certain new and useful Improvements in Plows, of which the following is a specification.

This invention relates more particularly to the draft devices of disk plows, the object being to dispense with the tongue or pole.

The invention also has for its object to provide an improved connection between the draft device and the front furrow wheel of the plow to enable said wheel to swing around when the implement is making a turn.

With these and other objects in view, which will be apparent when the invention is better understood, the same consists in a novel construction and arrangement of parts to be hereinafter described and claimed, reference being had to the accompanying drawing, in which a plan view of the implement is shown with the invention applied thereto.

Referring more particularly to the drawing, 5 denotes the beams of a disk plow, each of said beams carrying a disk 6. A gang plow is shown, but it will be understood that the invention may be applied to a single disk plow with equal facility. One of the beams carries a land wheel 7 and a rear furrow wheel 8. To the front end of the other beam 5 is secured a laterally extending plate 9, carrying a bearing 10 in which is journaled the vertical spindle portion 11 of the axle 12 of the front furrow wheel 13. This gives the axle 12 a pivotal support so that the front furrow wheel is free to swing bodily in the direction of the main frame to facilitate the turning movement of the implement.

The parts so far described are common in disk plows, and as nothing is claimed with respect thereto, it is thought that a further description is not necessary.

On the front end of the beam 5, which carries the plate 9, is also mounted a plate 14 extending laterally from the beam in the opposite direction from said plate. This plate 14 has a slot 15 extending transversely of the implement, and by means of a bolt 16 passing through this slot, a draft plate 17 is pivotally secured to said plate, the bolt also passing through the draft plate. The slot permits adjustment of the draft plate transversely of the implement. The draft plate extends forwardly from the plate 14, and carries at its outer end an evener bar 18 carrying double-trees 19. A three-horse hitch is shown. If a two or four-horse hitch is desired, the draft plate will be connected to the plate 9, said plate having a slot 20 for this purpose, extending transversely of the implement.

In order that the front furrow wheel may swing when the implement is making a turn, a connection is made between the axle of said wheel and the draft plate 17. This connection is made as follows: The axle 12 of the front furrow wheel projects a short distance from the outer side of said wheel, and to said projecting portion is fastened a bar 21 extending inwardly in an arch across the front portion of the wheel. A bar 22 fastened to the outer end of the bar 21 extends to and is secured to the under side of the draft plate near its front end, by the same bolt that secures the evener bar. In order that the hereindescribed adjustment of the draft plate may be made, the bar 22 has a series of bolt holes 23 by means of which an adjustable connection with the draft plate may be made.

It will be seen from the foregoing that when the draft plate swings to make a turn, the front furrow wheel swings with it, and this is effected without employing a tongue or pole.

By carrying the connection between the draft plate and the front furrow wheel axle around to the outer end of the axle, a better control of the furrow wheel is had, and in case of the wheel striking an obstruction, a part of the strain will be borne by the arched bar 21. Another advantage of the arrangement is that the hitch can be made shorter without danger of the wheel whipping around, as it has a smaller leverage on the team.

The device herein described is very simple in construction, it can be readily applied, and it effectually serves the purpose for which it is designed.

I claim:

1. In a plow, the combination with the frame, and a front furrow wheel mounted on a pivoted axle; of a draft plate connected to the frame, and a connection between said draft plate and the front furrow wheel axle on the outer side of said wheel.

2. In a plow, the combination with the frame, and a front furrow wheel mounted on a pivoted axle; of a draft plate connected to the frame, an arched member secured to the outer end of the front furrow wheel axle on the outer side of said wheel, and extending inwardly in front of said wheel, and a connection between said member and the draft plate.

3. In a plow, the combination with the frame, and a front furrow wheel mounte on a pivoted axle, of a plate carried by the frame, said plate having a slot extending transversely of the plow, a draft plate adjustably connected to the slot, and a connection between the draft plate and the front furrow wheel axle on the outer side of said wheel.

In testimony whereof I affix my signature in presence of two witnesses.

GEORGE A. KNOX.

Witnesses:
GEORGE W. WOOD,
H. WILL DOW.